(12) United States Patent
Lian et al.

(10) Patent No.: US 11,299,041 B2
(45) Date of Patent: Apr. 12, 2022

(54) POWER-DRIVEN SYSTEM FOR VEHICLE AND VEHICLE

(71) Applicant: BYD COMPANY LIMITED, Shenzhen (CN)

(72) Inventors: Yubo Lian, Shenzhen (CN); Heping Ling, Shenzhen (CN); Zhen Zhai, Shenzhen (CN); Fei Wu, Shenzhen (CN); Youbin Xu, Shenzhen (CN)

(73) Assignee: BYD Company Limited, Guangdong (CN)

( * ) Notice: Subject to any disclaimer, the term of this patent is extended or adjusted under 35 U.S.C. 154(b) by 598 days.

(21) Appl. No.: 16/335,843

(22) PCT Filed: Aug. 4, 2017

(86) PCT No.: PCT/CN2017/096040
§ 371 (c)(1),
(2) Date: Mar. 22, 2019

(87) PCT Pub. No.: WO2018/059123
PCT Pub. Date: Apr. 5, 2018

(65) Prior Publication Data
US 2020/0023733 A1    Jan. 23, 2020

(30) Foreign Application Priority Data

Sep. 28, 2016  (CN) .......................... 201610858369.5

(51) Int. Cl.
*B60K 17/02*          (2006.01)
*B60K 17/08*          (2006.01)
(Continued)

(52) U.S. Cl.
CPC .............. *B60K 17/02* (2013.01); *B60K 17/08* (2013.01); *B60K 17/16* (2013.01); *B60K 17/22* (2013.01);
(Continued)

(58) Field of Classification Search
CPC .................................................. B60K 6/4825
See application file for complete search history.

(56) References Cited

U.S. PATENT DOCUMENTS

2006/0102409 A1* 5/2006 Kamada ................. B60K 6/442
 180/249
2006/0276289 A1* 12/2006 Hirata ................... B60W 20/15
 475/5

(Continued)

FOREIGN PATENT DOCUMENTS

| CN | 102107604 A | 6/2011 |
| CN | 102114770 A | 7/2011 |

(Continued)

OTHER PUBLICATIONS

The World Intellectual Property Organization (WIPO) International Search Report for PCT/CN2017/096040 dated Oct. 26, 2017 6 Pages.

*Primary Examiner* — Brian L Swenson
(74) *Attorney, Agent, or Firm* — Anova Law Group, PLLC (57) ABSTRACT

A power-drive system for a vehicle and a vehicle. The power-drive system comprises: an engine; a plurality of input shafts; a plurality of output shafts; a first clutch device, arranged between the engine and the plurality of input shafts, so that the engine selectively engages with at least one of the plurality of input shafts; a motor power shaft, a motor power shaft first gear linking with a gear-position driving gear in the same direction being freely sleeved on the motor power shaft, and the plurality of output shafts and the motor power shaft linking with a differential of the vehicle; a first motor generator, configured to link with the motor power shaft; and a second motor generator, wherein the second motor generator and the engine are located on an input side of the first clutch device, the plurality of input (Continued)

shafts is located on an output side of the first clutch device, and the second motor generator is configured to carry out stationary power generation using at least part of power of the engine when the vehicle is parked.

18 Claims, 4 Drawing Sheets

(51) Int. Cl.
    *B60K 17/16*     (2006.01)
    *B60K 17/22*     (2006.01)
    *B60K 17/28*     (2006.01)

(52) U.S. Cl.
    CPC ........... *B60K 17/28* (2013.01); *B60Y 2400/42* (2013.01); *B60Y 2400/43* (2013.01); *B60Y 2400/80* (2013.01)

(56) References Cited

U.S. PATENT DOCUMENTS

| | | | | |
|---|---|---|---|---|
| 2013/0079961 A1* | 3/2013 | Kaifuku | ................. | B60K 6/547 701/22 |
| 2013/0304293 A1* | 11/2013 | Yoshikawa | ........... | B60W 10/02 701/22 |
| 2013/0324341 A1* | 12/2013 | Cho | ......................... | B60K 6/48 475/5 |
| 2014/0162839 A1* | 6/2014 | Miyazaki | ............... | B60W 10/02 477/5 |
| 2014/0172217 A1* | 6/2014 | Miyazaki | ............... | B60K 6/445 701/22 |
| 2014/0309079 A1* | 10/2014 | Tabata | ................... | B60K 6/485 477/5 |
| 2016/0159212 A1* | 6/2016 | Omuro | .................. | B60K 6/365 475/5 |
| 2016/0207391 A1* | 7/2016 | Yang | ........................ | B60K 6/48 |

FOREIGN PATENT DOCUMENTS

| | | |
|---|---|---|
| CN | 204095490 U | 1/2015 |
| CN | 104608612 A | 5/2015 |
| CN | 104608621 A | 5/2015 |
| CN | 104773062 A | 7/2015 |
| CN | 104773063 A | 7/2015 |
| CN | 104786814 A | 7/2015 |
| CN | 104786816 A | 7/2015 |
| CN | 105459792 A | 4/2016 |
| JP | 2003301897 A | 10/2003 |

\* cited by examiner

POWER-DRIVEN SYSTEM FOR VEHICLE AND VEHICLE

CROSS-REFERENCE TO RELATED APPLICATIONS

This application is a national phase entry under 35 U.S.C. § 371 of International Application No. PCT/CN2017/096040, filed on Aug. 4, 2017, which claims a priority to and benefits of Chinese Patent Application Serial No. 201610858369.5, filed with the State Intellectual Property Office of P. R. China on Sep. 28, 2016, the entire content of all of which is incorporated herein by reference.

FIELD

The present disclosure relates to the technical field of vehicles and, in particular, to a power-drive system for a vehicle and a vehicle having the power-drive system.

BACKGROUND

With constant consumption of energy, the development and utilization of new energy vehicles have gradually become a trend. As one of the new energy vehicles, hybrid vehicles driven by engines and/or motors have multiple modes and can improve the drive efficiency and the fuel economy.

However, in related technologies, the hybrid vehicles have few drive modes, low drive efficiency, and low power generation efficiency under the stationary power generation condition.

SUMMARY

The present disclosure aims at resolving one of technical problems in related technologies at least to some extent. Accordingly, the embodiments of the present disclosure propose a power-drive system with rich drive modes, high drive efficiency and high stationary power generation efficiency for a vehicle.

The embodiments of the present disclosure further provide a vehicle.

A power-drive system for a vehicle according to an embodiment of the present disclosure, comprising: an engine; a plurality of input shafts, a gear-position driving gear being arranged on each input shaft; a plurality of output shafts, a gear-position driven gear being arranged on each output shaft, the gear-position driven gears correspondingly meshing with the gear-position driving gears; a first clutch device, arranged between the engine and the plurality of input shafts, so that the engine selectively engages with at least one of the plurality of input shafts; a motor power shaft, a motor power shaft first gear that can be engaged to the motor power shaft being freely sleeved on the motor power shaft, the motor power shaft first gear linking with one gear-position driving gear in the same direction, and the plurality of output shafts and the motor power shaft linking with a differential of the vehicle; a first motor generator, configured to link with the motor power shaft; and a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked.

The power-drive system for a vehicle according to an embodiment of the present disclosure is rich in drive modes and high in drive efficiency in a pure electric mode and a hybrid mode, thereby improving the dynamic property and economic efficiency of the vehicle. In addition, the stationary power generation efficiency is high when the vehicle is parked.

In some examples of the present disclosure, the first clutch device is a double-clutch device and has an input end, a first output end and a second output end, the input end selectively engaging with at least one of the first output end and the second output end.

In some examples of the present disclosure, the input end is provided with input end outer teeth, and the second motor generator links with the input end outer teeth.

In some examples of the present disclosure, the second motor generator is coaxially connected with the input end.

In some examples of the present disclosure, a second clutch device is arranged between the second motor generator and the engine.

In some examples of the present disclosure, the second clutch device is arranged inside a rotor of the second motor generator.

In some examples of the present disclosure, the engine, the second clutch device and the input end of the first clutch device are arranged coaxially.

In some examples of the present disclosure, the rated power of the first motor generator is greater than that of the second motor generator.

In some examples of the present disclosure, the rated power of the first motor generator is two or more times that of the second motor generator.

In some examples of the present disclosure, the second motor generator is located between the first clutch device and the engine.

In some examples of the present disclosure, the power-drive system further comprises: an intermediate idle gear, which links with the motor power shaft first gear and one of the gear-position driving gears respectively.

In some examples of the present disclosure, the intermediate idle gear is a duplicate gear, and has a first gear portion meshing with one of the gear-position driving gears and a second gear portion meshing with the motor power shaft first gear.

In some examples of the present disclosure, a motor power shaft synchronizer for engaging the motor power shaft first gear with the motor power shaft is further arranged on the motor power shaft.

In some examples of the present disclosure, the motor power shaft synchronizer shares a first shift mechanism with a gear-position synchronizer corresponding to one gear-position driven gear.

In some examples of the present disclosure, the plurality of input shafts comprises: a first input shaft and a second input shaft, the second input shaft being sleeved on the first input shaft, a first-gear driving gear, a third-gear driving gear, a fifth-gear driving gear and a seventh-gear driving gear being arranged on the first input shaft, and a second-gear driving gear and a fourth-sixth-gear driving gear being arranged on the second input shaft; the plurality of output shafts comprises: a first output shaft and a second output shaft, a first-gear driven gear, a second-gear driven gear, a third-gear driven gear and a fourth-gear driven gear being freely sleeved on the first output shaft, and a fifth-gear driven gear, a sixth-gear driven gear and a seventh-gear driven gear being freely sleeved on the second output shaft; a first-third-gear synchronizer is arranged between the first-gear driven gear and the third-gear driven gear, a second-fourth-gear synchronizer is arranged between the second-gear driven gear and the fourth-gear driven gear, a fifth-seventh-gear synchronizer is arranged between the fifth-gear driven gear and the seventh-gear driven gear, and a sixth-gear synchronizer is arranged on one side of the sixth-gear driven gear.

In some examples of the present disclosure, a motor power shaft synchronizer for engaging the motor power shaft first gear with the motor power shaft is further arranged on the motor power shaft, and the motor power shaft synchronizer shares a first shift mechanism with the sixth-gear synchronizer.

In some examples of the present disclosure, a first output shaft output gear is fixedly arranged on the first output shaft, a second output shaft output gear is fixedly arranged on the second output shaft, a motor power shaft output gear is fixedly arranged on the motor power shaft, and the first output shaft output gear, the second output shaft output gear and the motor power shaft output gear mesh with a main reducer driven gear of the vehicle respectively.

A vehicle according to an embodiment of the present disclosure comprises the power-drive system according to the above embodiments of the present disclosure.

The vehicle according to the embodiment of the present disclosure has the same beneficial effects as the power-drive system according to the above embodiments of the present disclosure, and details are omitted herein.

DETAILED DESCRIPTION

The embodiments of the present disclosure are described in detail below. Examples of the embodiments are illustrated in the accompanying drawings. The embodiments described below with reference to the accompanying drawings are exemplary, and are used for explaining rather than limiting the present disclosure.

The following describes a power-drive system 100 according to an embodiment of the present disclosure in detail below with reference to the accompanying drawings. The power-drive system 100 can be applied to a vehicle 1000, e.g., a hybrid vehicle 1000.

The power-drive system 100 according to an embodiment of the present disclosure may include: an engine 1, a plurality of input shafts, a plurality of output shafts, a first motor generator 4, a second motor generator 6 and a motor power shaft 41. Of course, the power-drive system 100 may also include other mechanical components, e.g., a first clutch device 5d, a second clutch device 7, and the like.

The engine 1 is configured to selectively engage with at least one of the plurality of input shafts. That is to say, when the engine 1 outputs power, the engine 1 can engage with the one of the plurality of input shafts to transmit power. Of course, the engine 1 can also simultaneously engage with several of the plurality of input shafts to transmit power. A gear-position driving gear is arranged on each input shaft, a gear-position driven gear is arranged on each output shaft, and the gear-position driven gears correspondingly mesh with the gear-position driving gears. Power transmission between the input shafts and the output shafts can be realized by engagement between the gear-position driving gears and the gear-position driven gears. The output speeds of the output shafts can be changed by selecting gear-position driving gears and gear-position driven gears with different drive ratios.

Figure 1:
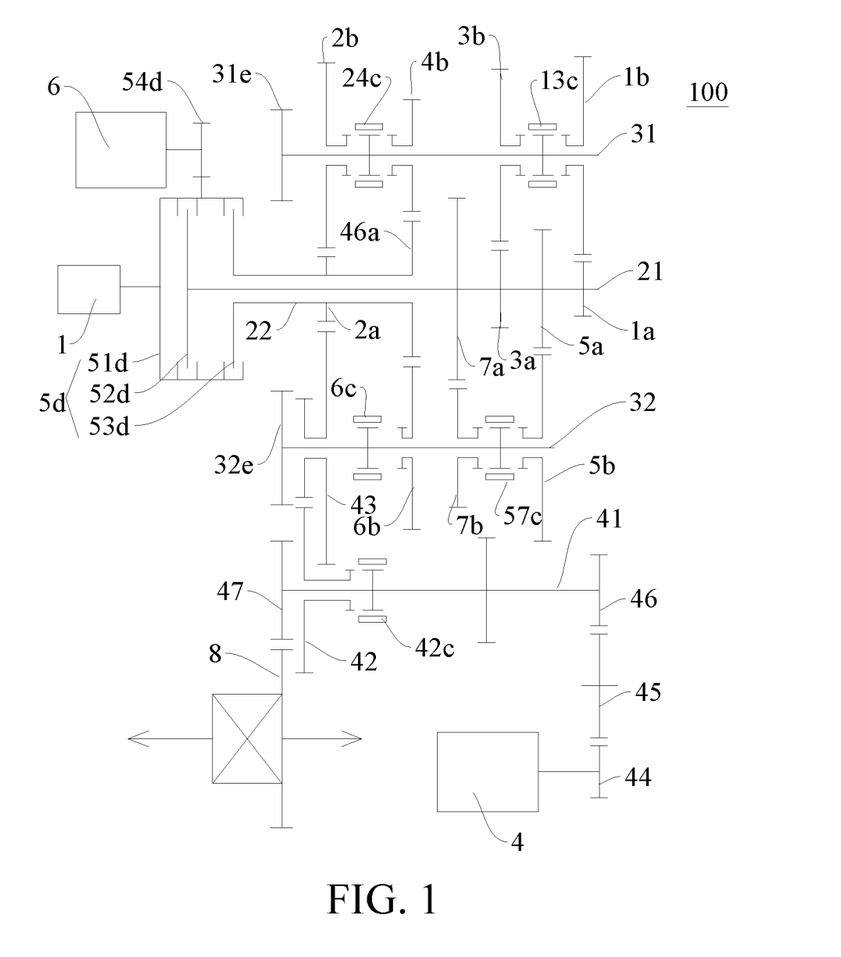
FIG. 1 is a schematic diagram of a power-drive system according to a first embodiment of the present disclosure.
Figure 2:
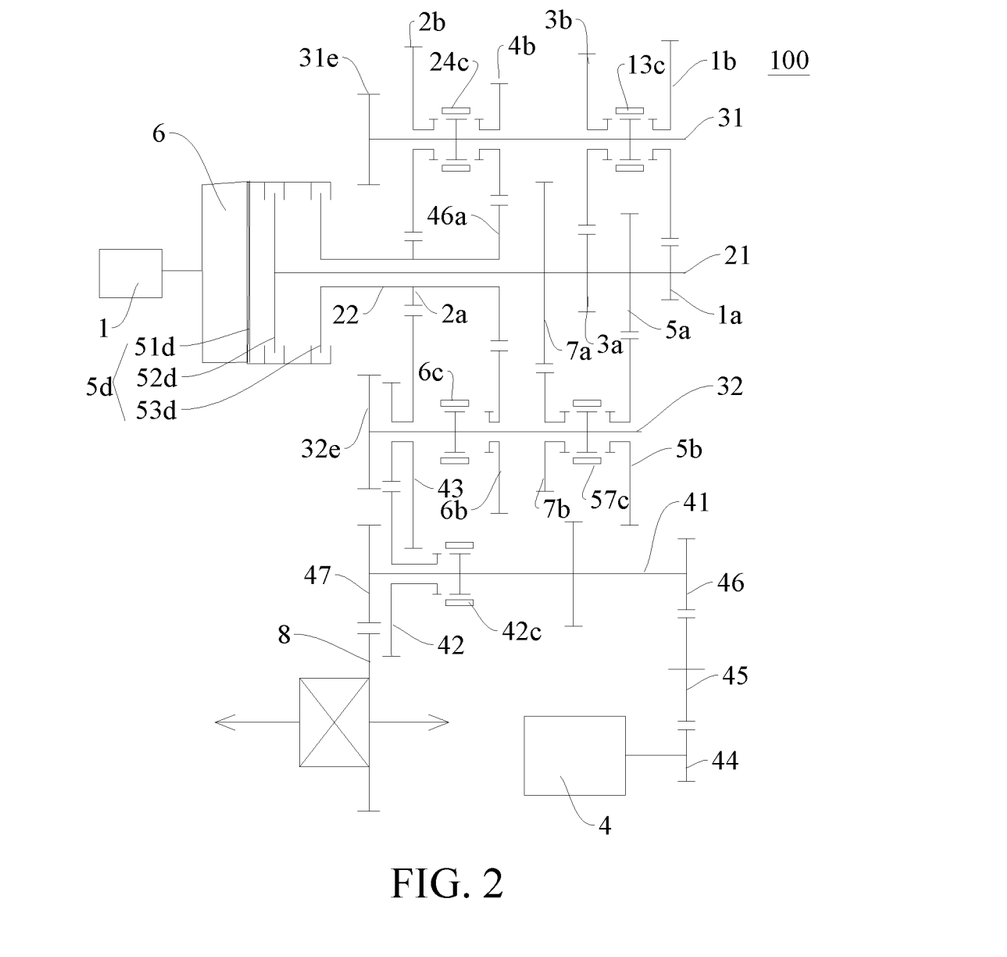
FIG. 2 is a schematic diagram of a power-drive system according to a second embodiment of the present disclosure.
Figure 3:
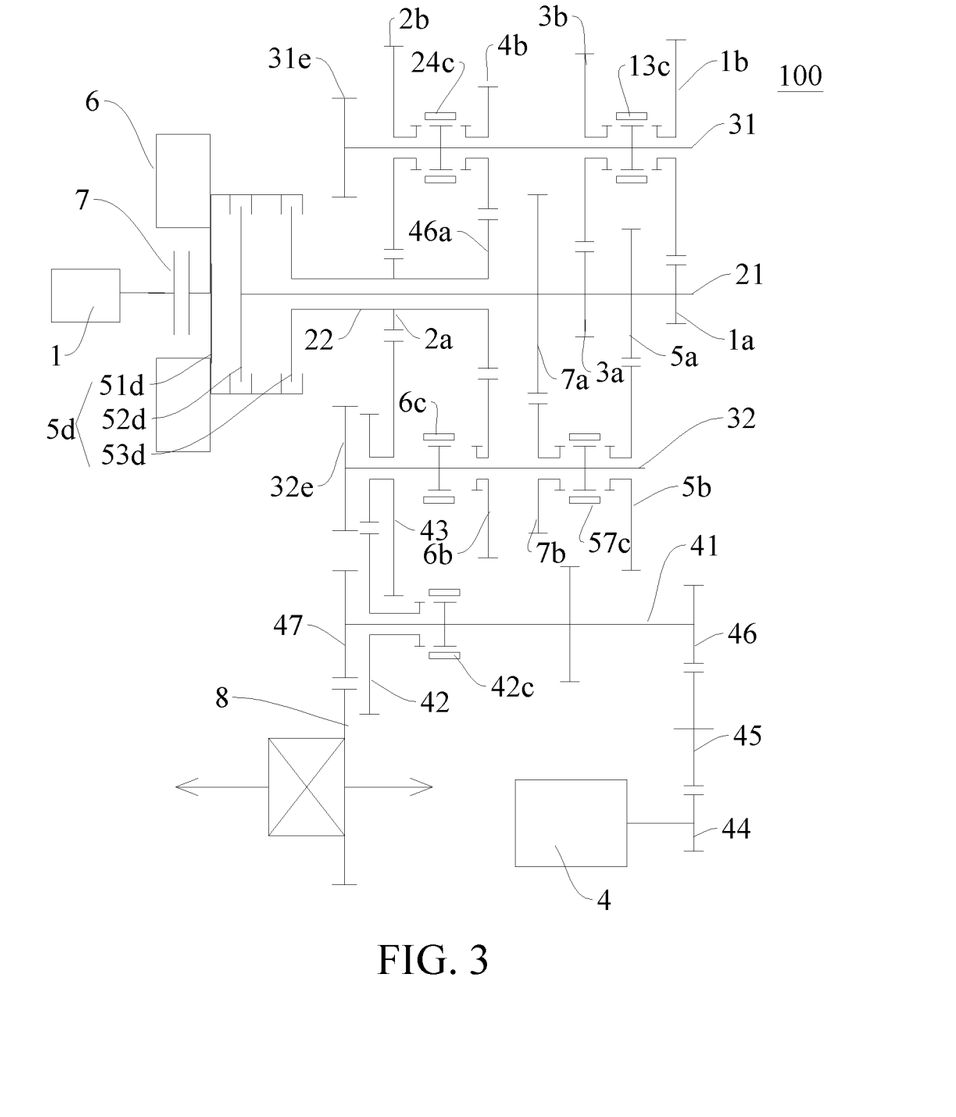
FIG. 3 is a schematic diagram of a power-drive system according to a third embodiment of the present disclosure.

The first clutch device 5d is arranged between the engine 1 and the plurality of input shafts, and the first clutch device 5d can allow the engine 1 to selectively engage with at least one of the plurality of input shafts. As shown in FIGS. 1-3, the first clutch device 5d may be a double-clutch device, and has an input end 51d, a first output end 52d and a second output end 53d. The input end 51d can selectively engage with at least one of the first output end 52d and the second output end 53d. That is, the input end 51d may engage with the first output end 52d, or engage with the second output end 53d, or simultaneously engage with the first output end 52d and the second output end 53d.

For example, as shown in FIGS. 1-3, the plurality of input shafts include a first input shaft 21 and a second input shaft 22, the first output end 52d is connected with the first input shaft 21, and the second output end 53d is connected with the second input shaft 22.

A first-gear driving gear 1a, a third-gear driving gear 3a, a fifth-gear driving gear 5a and a seventh-gear driving gear 7a are arranged on the first input shaft 21. A second-gear driving gear 2a and a fourth-sixth-gear driving gear 46a are arranged on the second input shaft 22. The second input shaft 22 is sleeved on the first input shaft 21, thereby effectively shortening the axial length of the power-drive system 100, and reducing the space of the vehicle 1000 occupied by the power-drive system 100. The fourth-sixth-gear driving gear 46a means that the gear can be used as a fourth-gear driving gear or a sixth-gear driving gear, thereby shortening the axial length of the second input shaft 22, and better reducing the size of the power-drive system 100.

In the direction gradually away from the engine 1, the second-gear driving gear 2a, the fourth-sixth-gear driving gear 46a, the seventh-gear driving gear 7a, the third-gear driving gear 3a, the fifth-gear driving gear 5a and the first-gear driving gear 1a are arranged in sequence. By properly arranging the plurality of gear-position driving gears, the plurality of gear-position driven gears and the plurality of output shafts can be arranged reasonably, so that the power-drive system 100 is simple in structure and small in size.

The plurality of output shafts includes: a first output shaft 31 and a second output shaft 32. A first-gear driven gear 1b, a second-gear driven gear 2b, a third-gear driven gear 3b and a fourth-gear driven gear 4b are freely sleeved on the first output shaft 31. A fifth-gear driven gear 5b, a sixth-gear driven gear 6b and a seventh-gear driven gear 7b are freely sleeved on the second output shaft 32.

The first-gear driving gear 1a meshes with the first-gear driven gear 1b, the second-gear driving gear 2a meshes with the second-gear driven gear 2b, the third-gear driving gear 3a meshes with the third-gear driven gear 3b, the fourth-sixth-gear driving gear 46a meshes with the fourth-gear driven gear 4b, the fifth-gear driving gear 5a meshes with the fifth-gear driven gear 5b, the fourth-sixth-gear driving gear 46a meshes with the sixth-gear driven gear 6b, and the seventh-gear driving gear 7a meshes with the seventh-gear driven gear 7b.

A first-third-gear synchronizer 13c is arranged between the first-gear driven gear 1b and the third-gear driven gear 3b, and the first-third-gear synchronizer 13c can be used for synchronizing the first-gear driven gear 1b with the first output shaft 31, and synchronizing the third-gear driven gear 3b with the first output shaft 31.

A second-fourth-gear synchronizer 24c is arranged between the second-gear driven gear 2b and the fourth-gear driven gear 4b, and the second-fourth-gear synchronizer 24c can be used for synchronizing the second-gear driven gear 2b with the first output shaft 31, and synchronizing the fourth-gear driven gear 4b with the first output shaft 31.

A fifth-seventh-gear synchronizer 57c is arranged between the fifth-gear driven gear 5b and the seventh-gear driven gear 7b, and the fifth-seventh-gear synchronizer 57c can be used for synchronizing the fifth-gear driven gear 5b with the second output shaft 32, and synchronizing the seventh-gear driven gear 7b with the second output shaft 32. A sixth-gear synchronizer 6c is arranged on one side of the sixth-gear driven gear 6b, and the sixth-gear synchronizer 6c can be used for synchronizing the sixth-gear driven gear 6b with the second output shaft 32.

A motor power shaft first gear 42 may be freely sleeved on the motor power shaft 41, a motor power shaft output gear 47 may be fixedly arranged on the motor power shaft 41, and the motor power shaft first gear 42 may selectively engage with the motor power shaft 41.

Specifically, as shown in FIG. 1 to FIG. 3, a motor power shaft synchronizer 42c may also be arranged on the motor power shaft 41, and the motor power shaft synchronizer 42c is used for engaging the motor power shaft first gear 42 with the motor power shaft 41.

The motor power shaft 41 and the plurality of output shafts link with a differential of the vehicle 1000.

It should be noted that the above-mentioned "link" can be understood as associated movement of a plurality of components (e.g., two). Taking the linkage of two components as an example, when one of the components moves, the other component also moves.

For example, in some embodiments of the present disclosure, the linkage of a gear and a shaft can be understood as, when the gear rotates, the shaft linked with the gear also rotates, or when the shaft rotates, the gear linked with the shaft also rotates.

For another example, the linkage of shafts can be understood as, when one of the shafts rotates, the other shaft linked with the shaft also rotates.

For another example, the linkage of gears can be understood as, when one of the gears rotates, the other gear linked with the gear also rotates.

In the following description of the present disclosure, the "link" is understood as the same, unless otherwise specified.

The motor power shaft first gear 42 links with one gear-position driving gear in the same direction. It should be noted that the linking in the same direction indicates that the motor power shaft first gear 42 and the one gear-position driving gear rotate in the same direction, and move correlatively.

As shown in FIG. 1 to FIG. 3, an intermediate idle gear 43 may be arranged between the motor power shaft first gear 42 and the one gear-position driving gear, so that the intermediate idle gear 43 can ensure that the motor power shaft first gear 42 links with the one gear-position driving gear in the same direction. Thus, when the vehicle 1000 is reversed, the power of the engine 1 can be transmitted to the differential through the one gear-position driving gear, the intermediate idle gear 43, the motor power shaft first gear 42, the motor power shaft 41 and the motor power shaft output gear 47, so as to achieve the reverse operation of the vehicle 1000.

In some examples of the present disclosure, as shown in FIG. 1 to FIG. 3, the intermediate idle gear 43 may be a duplicate gear, and has a first gear portion meshing with the one gear-position driving gear and a second gear portion meshing with the motor power shaft first gear 42. The intermediate idle gear 43 is sleeved on the second output shaft 32, whereby the position of the intermediate idle gear 43 is appropriate, and the structure of the power-drive system 100 is reliable.

Specifically, the one gear-position driving gear may be the second-gear driving gear 2a, that is, the intermediate idle gear 43 meshes with the second-gear driving gear 2a and the motor power shaft first gear 42 respectively, thus realizing the power transmission between the second-gear driving gear 2a and the motor power shaft first gear 42.

The motor power shaft synchronizer 42c shares a first shift mechanism with a gear-position synchronizer corresponding to one gear-position driven gear. This can save a shift mechanism, so that the cost of the power-drive system 100 can be reduced, and the structure of the power-drive system 100 is simple and reliable.

Specifically, as shown in FIG. 1 to FIG. 3, the motor power shaft synchronizer 42c shares a first shift mechanism with the sixth-gear synchronizer 6c.

As shown in FIG. 1, when the first shift mechanism shifts the motor power shaft synchronizer 42c and the sixth-gear synchronizer 6c to the left, the sixth-gear driven gear 6b is disengaged from the second output shaft 32, and the motor power shaft first gear 42 is engaged with the motor power shaft 41. When the first shift mechanism shifts the motor power shaft synchronizer 42c and the sixth-gear synchronizer 6c to the right, the sixth-gear driven gear 6b is engaged with the second output shaft 32, and the motor power shaft first gear 42 is disengaged from the motor power shaft 41.

As shown in FIG. 1 to FIG. 3, a first output shaft output gear 31e is fixedly arranged on the first output shaft 31, a second output shaft output gear 32e is fixedly arranged on the second output shaft 32, and the motor power shaft output gear 47, the first output shaft output gear 31e and the second output shaft output gear 32e mesh with a main reducer driven gear 8 of the vehicle 1000 respectively. It can be understood that the power transmitted to the first output shaft 31 and the second output shaft 32 can be transmitted to the main reducer driven gear 8 through the first output shaft output gear 31e and the second output shaft output gear 32e respectively, thereby driving corresponding wheels to rotate. Power transmission exists between the main reducer driven gear 8 and the differential. Specifically, the main reducer driven gear 8 transmits power to the differential to drive the wheels to rotate.

The first motor generator 4 links with the motor power shaft 41. When the first motor generator 4 is used as a motor, the first motor generator 4 can transmit power to the motor power shaft 41. When the first motor generator 4 is used as a generator, the motor power shaft 41 can transmit power to the first motor generator 4 for power generation.

As shown in FIG. 1 to FIG. 3, drive gears may be arranged between the first motor generator 4 and the motor power shaft. Three drive gears are provided, respectively a first drive gear 44, a second drive gear 45 and a third drive gear 46. The first drive gear 44 is fixed on a motor shaft of the first motor generator 4, the third drive gear 46 is fixedly connected to the motor power shaft 41, and the second drive gear 45 is meshed between the first drive gear 44 and the third drive gear 46.

The second motor generator 6 and the engine 1 are located on an input side of the first clutch device 5d, and the second motor generator 6 may be located between the first clutch device 5d and the engine 1. The second motor generator 6 is arranged on the input side of the first clutch device 5d, so that the axial length of the power-drive system 100 can be effectively reduced, and the second motor generator 6 can be arranged rationally to improve the structural compactness of the power-drive system 100.

The second motor generator 6 can be a motor generator having small capacity and small size, thereby meeting the miniaturization requirement of a transmission. The internal structure of the transmission has strict requirements on the space, and the second motor generator 6 having small size occupies a small space of the transmission, so that the second motor generator 6 is prevented from interfering with other components (e.g., the first clutch device 5d), and the transmission is reasonable and compact in structure.

The plurality of input shafts is located on the output side of the first clutch device 5d. The second motor generator 6 is configured to carry out stationary power generation using at least part of the power of the engine 1 when the vehicle 1000 is parked. When the vehicle 1000 is parked, at least part of the power of the engine 1 can be directly transferred to the second motor generator 6 for power generation, or at least part of the power of the engine 1 can be indirectly transmitted to the second motor generator 6 for power generation through the input end 51d.

The following describes the connection relationship between the engine 1 and the second motor generator 6 with reference to the accompanying drawings.

As shown in FIG. 1, input end outer teeth 54d may be arranged on the input end 51d, and the second motor generator 6 links with the input end outer teeth 54d. Thus, the power of the engine 1 can be transmitted to the second motor generator 6 through the input end 51d and the input end outer teeth 54d, and the second motor generator 6 can be used as a generator for stationary power generation.

As shown in FIG. 2, the second motor generator 6 and the input end 51d can be coaxially connected. The second motor generator 6 may be arranged between the input end 51d and the engine 1, such that the power of the engine 1 necessarily passes through the second motor generator 6 when being transmitted to the input end 51d, whereby the second motor generator 6 can be used as a generator for stationary power generation.

As shown in FIG. 3, a second clutch device 7 is arranged between the second motor generator 6 and the engine 1. The second clutch device 7 is a single clutch, and the second clutch device 7 can control the engagement and disengagement between the engine 1 and the second motor generator 6, and control the engagement and disengagement between the engine 1 and the input end 51d. By providing the second clutch device 7, the stationary power generation state of the second motor generator 6 can be reasonably controlled, so that the power-drive system 100 is simple in structure and reliable in drive mode conversion.

In some embodiments of the present disclosure, the second clutch device 7 is arranged inside a rotor of the second motor generator 6. In this way, the axial length of the power-drive system 100 can be better shortened, so that the size of the power-drive system 100 can be reduced, and the arrangement flexibility of the power-drive system 100 on the vehicle 1000 can be improved. In addition, the second motor generator 6 can also be used as a starter.

In some embodiments of the present disclosure, the engine 1, the second clutch device 7, and the input end 51d of the first clutch device 5d are coaxially arranged. Thus, the power-drive system 100 is compact in structure and small in size.

It should be noted that, for the power-drive system 100 according to the above three embodiments, the second motor generator 6 is located between the engine 1 and the first clutch device 5d in the axial direction, so that the axial length of the power-drive system 100 can be effectively shortened, the second motor generator 6 can be reasonably arranged, and the structural compactness of the power-drive system 100 can be improved.

The first motor generator 4 is a main drive motor of the power-drive system 100, so the capacity and size of the first motor generator 4 are large. The motor power shaft 41 is provided to minimize the size of the power-drive system 100, and to avoid the interference between the first motor generator 4 and the second motor generator 6.

In an embodiment of the present disclosure, the rated power of the first motor generator 4 is greater than that of the second motor generator 6. The second motor generator 6 can be a motor generator having small size and small rated power, so that the power-drive system 100 is simple in structure and small in size. In addition, during the stationary power generation, the transmission path between the second motor generator 6 and the engine 1 is short, the power generation efficiency is high, and a part of the power of the engine 1 can be efficiently converted into electric energy. Furthermore, the peak power of the first motor generator 4 is also greater than that of the second motor generator 6.

In some embodiments of the present disclosure, the rated power of the first motor generator 4 is two or more times that of the second motor generator 6. The peak power of the first motor generator 4 is two or more times that of the second motor generator 6. For example, the rated power of the first motor generator 4 may be 60 kW, the rated power of the second motor generator 6 may be 24 kW, the peak power of the first motor generator 4 may be 120 kW, and the peak power of the second motor generator 6 may be 44 kW.

The following describes the operating modes of the power-drive system 100 for the vehicle 1000 according to an embodiment of the present disclosure in detail with reference to the accompanying drawings. The difference between the power-drive system 100 shown in FIG. 2 and FIG. 3 and the power-drive system 100 shown in FIG. 1 is mainly embodied in the arrangement of the second motor generator 6, but the arrangement of the second motor generator 6 has little influence on the operating mode, so the operating mode of the power-drive system 100 shown in FIG. 2 and FIG. 3 is substantially the same as the operating mode of the power-drive system 100 shown in FIG. 1. The following describes the operating mode of the power-drive system 100 shown in FIG. 1 in detail as an example.

Pure engine mode: the power of the engine 1 is transmitted to the first input shaft 21 and/or the second input shaft 22 through the first clutch device 5d, then transmitted to the first output shaft 31 or the second output shaft 32 through a corresponding gear-position gear pair, and finally transmitted to the differential to drive the wheels to rotate. The gear-position gear pair includes a gear-position driving gear and a gear-position driven gear corresponding to each other. In this mode, the input end 51d of the first clutch device 5d selectively engages with at least one of the two output ends.

Pure electric mode: when the first motor generator 4 is used as a motor, the power of the first motor generator 4 is transmitted to the differential through the motor power shaft 41 and the motor power shaft output gear 47 in sequence to drive the wheels to rotate.

Hybrid mode: a combination of the pure engine mode and the pure electric mode, the power of the engine 1 and the power of the first motor generator 4 are coupled at the main reducer driven gear 8.

Stationary power generation mode: the power of the engine 1 is all transmitted to the second motor generator 6 through the input end 51*d* of the first clutch device 5*d*, and the second motor generator 6 functions as a generator for stationary power generation.

First driving power generation mode: a part of the power of the engine 1 is transmitted to the differential through the first clutch device 5*d*, the input shaft and the output shaft to drive the wheels to rotate, and the other part of the power of the engine 1 is transmitted to the second motor generator 6 through the input end 51*d* of the first clutch device 5*d* for power generation.

Second driving power generation mode: the power of the engine 1 is transmitted to the differential through the first clutch device 5*d*, the input shaft and the output shaft to drive the wheels to rotate, and the main reducer driven gear 8 can transmit a part of the power to the first motor generator 4 through the motor power shaft output gear 47 and the motor power shaft 41 for power generation.

Figure 4:
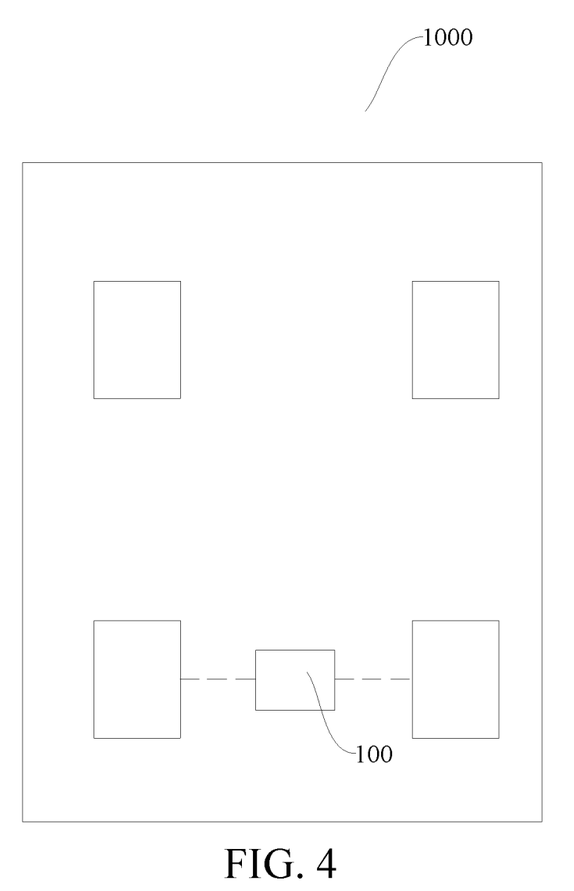
FIG. 4 is a structure diagram of a vehicle according to an embodiment of the present disclosure.

As shown in FIG. 4, the vehicle 1000 according to an embodiment of the present disclosure includes the power-drive system 100 for a vehicle 1000 according to the above embodiments of the present disclosure.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A power-drive system for a vehicle, comprising:
   an engine;
   a plurality of input shafts, a gear-position driving gear being arranged on each input shaft;
   a plurality of output shafts, a gear-position driven gear being arranged on each output shaft, the gear-position driven gears correspondingly meshing with the gear-position driving gears;
   a first clutch device, arranged between the engine and the plurality of input shafts, so that the engine selectively engaging with at least one of the plurality of input shafts;
   a motor power shaft, a motor power shaft first gear that can be engaged to the motor power shaft being freely sleeved on the motor power shaft, the motor power shaft first gear linking with one gear-position driving gear in the same direction, and the plurality of output shafts and the motor power shaft linking with a differential of the vehicle;
   a first motor generator, configured to link with the motor power shaft; and
   a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked.

2. The power-drive system for a vehicle according to claim 1, wherein the first clutch device is a double-clutch device and has an input end, a first output end and a second output end, the input end selectively engaging with at least one of the first output end and the second output end.

3. The power-drive system for a vehicle according to claim 2, wherein the input end is provided with input end outer teeth, and the second motor generator links with the input end outer teeth.

4. The power-drive system for a vehicle according to claim 2, wherein the second motor generator is coaxially connected with the input end.

5. The power-drive system for a vehicle according to claim 2, wherein a second clutch device is arranged between the second motor generator and the engine.

6. The power-drive system for a vehicle according to claim 5, wherein the second clutch device is arranged inside a rotor of the second motor generator.

7. The power-drive system for a vehicle according to claim 5, wherein the engine, the second clutch device and the input end of the first clutch device are arranged coaxially.

8. The power-drive system for a vehicle according to claim 1, wherein the rated power of the first motor generator is greater than that of the second motor generator.

9. The power-drive system for a vehicle according to claim 8, wherein the rated power of the first motor generator is two or more times that of the second motor generator.

10. The power-drive system for a vehicle according to claim 1, wherein the second motor generator is located between the first clutch device and the engine.

11. The power-drive system for a vehicle according to claim 1, further comprising: an intermediate idle gear, which links with the motor power shaft first gear and one of the gear-position driving gears respectively.

12. The power-drive system for a vehicle according to claim 11, wherein the intermediate idle gear is a duplicate gear, and has a first gear portion meshing with one of the gear-position driving gears and a second gear portion meshing with the motor power shaft first gear.

13. The power-drive system for a vehicle according to claim 1, wherein a motor power shaft synchronizer for engaging the motor power shaft first gear with the motor power shaft is further arranged on the motor power shaft.

14. The power-drive system for a vehicle according to claim 13, wherein the motor power shaft synchronizer shares a first shift mechanism with a gear-position synchronizer corresponding to one gear-position driven gear.

15. The power-drive system for a vehicle according to claim 1, wherein the plurality of input shafts comprises: a first input shaft and a second input shaft, the second input shaft being sleeved on the first input shaft, a first-gear driving gear, a third-gear driving gear, a fifth-gear driving gear and a seventh-gear driving gear being arranged on the first input shaft, and a second-gear driving gear and a fourth-sixth-gear driving gear being arranged on the second input shaft;

the plurality of output shafts comprises: a first output shaft and a second output shaft, a first-gear driven gear, a second-gear driven gear, a third-gear driven gear and a fourth-gear driven gear being freely sleeved on the first output shaft, and a fifth-gear driven gear, a sixth-gear driven gear and a seventh-gear driven gear being freely sleeved on the second output shaft; and a first-third-gear synchronizer is arranged between the first-gear driven gear and the third-gear driven gear, a second-fourth-gear synchronizer is arranged between the second-gear driven gear and the fourth-gear driven gear, a fifth-seventh-gear synchronizer is arranged between the fifth-gear driven gear and the seventh-gear driven gear, and a sixth-gear synchronizer is arranged on one side of the sixth-gear driven gear.

16. The power-drive system for a vehicle according to claim 15, wherein a motor power shaft synchronizer for engaging the motor power shaft first gear with the motor power shaft is further arranged on the motor power shaft, and the motor power shaft synchronizer shares a first shift mechanism with the sixth-gear synchronizer.

17. The power-drive system for a vehicle according to claim 15, wherein a first output shaft output gear is fixedly arranged on the first output shaft, a second output shaft output gear is fixedly arranged on the second output shaft, a motor power shaft output gear is fixedly arranged on the motor power shaft, and the first output shaft output gear, the second output shaft output gear and the motor power shaft output gear mesh with a main reducer driven gear of the vehicle respectively.

18. A vehicle, comprising:
a power-drive system including:
an engine;
a plurality of input shafts, a gear-position driving gear being arranged on each input shaft;
a plurality of output shafts, a gear-position driven gear being arranged on each output shaft, the gear-position driven gears correspondingly meshing with the gear-position driving gears;
a first clutch device, arranged between the engine and the plurality of input shafts, so that the engine selectively engaging with at least one of the plurality of input shafts;
a motor power shaft, a motor power shaft first gear that can be engaged to the motor power shaft being freely sleeved on the motor power shaft, the motor power shaft first gear linking with one gear-position driving gear in the same direction, and the plurality of output shafts and the motor power shaft linking with a differential of the vehicle;
a first motor generator, configured to link with the motor power shaft and
a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked.

* * * * *